US007453464B1

(12) United States Patent
Acquavella

(10) Patent No.: US 7,453,464 B1
(45) Date of Patent: Nov. 18, 2008

(54) TEXT MODIFICATION

(75) Inventor: James Acquavella, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 32 days.

(21) Appl. No.: 10/382,663

(22) Filed: Mar. 5, 2003

(51) Int. Cl.
*G06T 13/00* (2006.01)
*G06T 11/00* (2006.01)

(52) U.S. Cl. ..................................... 345/474; 345/471

(58) Field of Classification Search ......... 345/468–475, 345/636, 689; 340/728
See application file for complete search history.

(56) References Cited

U.S. PATENT DOCUMENTS

| | | | | |
|---|---|---|---|---|
| 6,473,081 | B1 * | 10/2002 | Silva et al. | 345/420 |
| 6,504,545 | B1 * | 1/2003 | Browne et al. | 345/473 |
| 6,512,522 | B1 * | 1/2003 | Miller et al. | 345/474 |
| 6,803,913 | B1 * | 10/2004 | Fushiki et al. | 345/467 |
| 6,956,574 | B1 * | 10/2005 | Cailloux et al. | 345/473 |
| 2002/0059603 | A1 * | 5/2002 | Kelts | 725/47 |
| 2003/0018646 | A1 * | 1/2003 | Ohta et al. | 707/100 |
| 2003/0043394 | A1 * | 3/2003 | Kuwata et al. | 358/1.9 |
| 2004/0110490 | A1 * | 6/2004 | Steele et al. | 455/412.1 |

OTHER PUBLICATIONS

Weinmann et al., "Photoshop 6 for Windows and Macintosh: Visual QuickStart Guide", Copy right Jan. 25, 2001.*

Allen, Lynn. "Down and Dirty Customizing-Part II". Discussion of AutoCAD. Mar. 1999, web publication, ☐☐http://cadence.advanstar.com/1999/0399/circles0399.html.*
Crumpler, Wendy. "Photoshop, Painter, and Illustrator Side-by-Side". 2000, Sybex, San Francisco, various pages.*
Harlan, Rod, Chapter 12: "Particle Playground Effects," in *Applying Adobe® After Effects™ Studio Techniques*, (Sam's Publishing, Indianapolis, Indiana, 2001), pp. 226-247.
Boris FX Software, *Top Ten New Features in RED 2.1*, http://www.borisfx.com/products/RED/top_ten_new.php, Retrieved from the Internet Jan. 5, 2007, 7 pgs.
PR Newswire, *Boris RED 2.0 Shits at NAB 2001*, http://www.prnewswire.com/cgi-bin/stories.pl?ACCT=104&STORY..., Retrieved from the Internet Jan. 5, 2007, 3 pgs.
Sellers, Dennis, *NAB: Boris RED 2.0 Ships*, Apr. 23, 2001, Retrieved from the Internet: http://www.creativepro.com/printerfriendly/story/13037.html, 2 pgs.

* cited by examiner

*Primary Examiner*—Ryan R Yang
(74) *Attorney, Agent, or Firm*—Fish & Richardson P.C.

(57) ABSTRACT

Methods and apparatus, including computer program products, for modifying the appearance of a text object. A modification hierarchy includes a plurality of modifiers, selection functions, and/or property operations. Each modifier includes one or more selection functions and one or more property operations. Each selection function defines a selection of at least a portion of one or more text units in a text object. Each property operation specifies an operation to be performed to modify one or more properties for text units in the selection. The modification hierarchy is defined by logical relationships between the modifiers, the selection functions and the property operations. The modification hierarchy is applied to the text object to modify the specified properties for the text units in the selection according to the selection functions and the property operations.

45 Claims, 5 Drawing Sheets

Modifier Properties
Selector Value Graph 1
(Add)

Selector Value Graph 2
(Subtract)

Resultant Selector
Value Graph

Properties     Rotation 45°    Opacity 0%

TEXT MODIFICATION

BACKGROUND

The present invention relates to modifying text in electronic documents.

Graphical illustration programs typically represent text as objects (i.e., text objects) that include a string of one or more characters. FIG. 1 is a block diagram illustrating a text object 100 that includes one or more characters 110. Each character 110 has one or more associated glyphs, which are graphic symbols, typically defined in a font, that define the shape of their associated characters. The rendered appearance of text can also be determined by properties, such as color, opacity, rotation, size, scale, stroke width, location and skew, that can be applied to render the text.

Typical graphical illustration programs allow users to modify the appearance of text in electronic documents or other media, such as film, video and multimedia, by changing property values associated with the text. Typically, when a user modifies a property of a particular text object, the modification applies equally to all of the characters in the text object. To modify properties of individual characters, or a subset of characters, in a given text object, the user must typically define separate text objects for each character or set of characters to be modified, and separately modify the properties associated with each of the new objects.

SUMMARY OF THE INVENTION

The present invention provides methods and apparatus, including computer program products, for applying variable modifications to characters in a text object.

In general, in one aspect, the invention features methods and apparatus, including computer program products, implementing techniques for modifying the appearance of a text object. A modification hierarchy is defined that specifies a modification to be applied to properties associated with text units in a text object, and the modification hierarchy is applied to the text object. The modification hierarchy includes one or more selection functions and one or more property operations. Each selection function defines a selection of at least a portion of one or more text units in the text object. Each property operation specifies an operation to be performed to modify one or more properties for text units in the selection. The modification hierarchy specifies either or both of a plurality of selection functions or a plurality of properties to be modified for the text object. The modification hierarchy is applied to modify the specified properties for the text units in the selection in one or more amounts defined by the selection functions and the property operations.

In general, in another aspect, the invention features methods and apparatus, including computer program products, implementing techniques for modifying text. A plurality of modifiers are generated, logical relationships between the modifiers, the selection functions and the property operations are defined to define a modification hierarchy, and the modification hierarchy is applied to a text object. Each modifier includes one or more selection functions and one or more property operations. Each selection function defines a selection of at least a portion of one or more text units in the text object. Each property operation specifies an operation to be performed to modify one or more properties for text units in the selection. The modification hierarchy is applied to modify the specified properties for the text units in the selection in one or more amounts defined by the selection functions and the property operations.

Particular implementations can include one or more of the following features. One or more of the selection functions can include a range of text units in the text object. The text units can represent characters in the text object and/or words in the text object. One or more of the selection functions can define a selection of a portion of at least one of the characters in the text object. The modification hierarchy can include a plurality of selection functions. The modification hierarchy can specify one or more operators, such as an addition operator, a subtraction operator, an intersect operator, a min operator, a max operator, or a difference operator. Two or more of the selection functions can be combined according to the operator(s) to define an aggregate selection function, such that the selection of text units in the text object are defined according to the aggregate selection function.

The text object can be rendered according to the modified properties. User input graphically defining one or more of the selection functions can be received. The properties to be modified can include at least one of fill color, fill opacity, anchor point, rotation, size, scale, stroke color, stroke opacity, stroke width, position, skew, font and character ID. Applying the modification hierarchy to the text object can include applying one or more modification hierarchies to the text object to create a plurality of modified text objects. An animation sequence can be defined for the text object based on the text object and the plurality of modified text objects. Applying the modification hierarchy to the text object can include applying one or more modification hierarchies to the text object to create a plurality of modified text objects. An animation sequence for the text object can be defined based on the text object and the plurality of modified text objects.

The invention can be implemented to realize one or more of the following advantages. A modification tool allows users to modify properties of a text object to affect selected characters of the text object. Characters within a text object can be affected by a given modification or modifications to varying degrees. The modification tool also allows properties of a text object to be animated on a per character basis.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In one aspect, the invention provides a text modification tool that can be used to apply properties to units of text in a text object, such as individual characters or groups of characters (e.g., words), or to the text object as a whole. To operate the tool, a user defines a modification hierarchy that includes one or more modification operations that will be applied to characters in the text object. Each modification operation is defined by a selection of one or more characters (or parts of characters) in the text object and one or more properties of the selected characters that will be modified. The user defines a selection for a given modification operation by defining and/or manipulating a selection function that will be applied to the text object to identify selected characters for modification by the modification operation. The selection function can be defined intuitively or mathematically and specifies, for each selected character, a selection value representing the degree to which the modification will be applied to the character.

Figure 1:
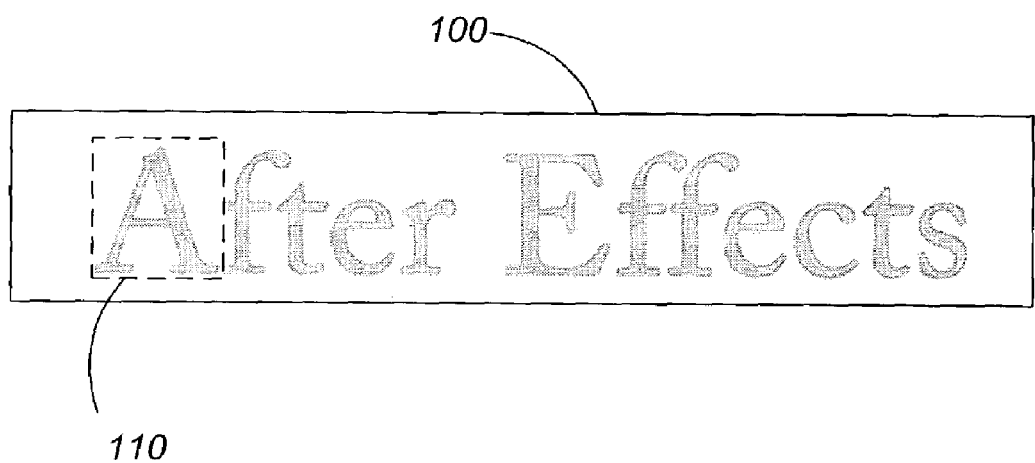
FIG. 1 is an illustration of a text object.

For example, the user can define a selection function by inputting reference numbers expressly associated with the characters to be modified (e.g., inputting "1, 3, 5" to modify the "A", "t" and "r" of "After" in FIG. 1) and specifying a selection value for each of the selected characters (e.g., "0.1, 0.5, 1.0" to specify a 10% modification for the "A", a 50% modification for the "t" and a 100% modification for the "r"). Alternatively, the user can define the selection function by inputting one or more characters, and the tool will respond by searching for the specified characters in the text object and selecting any found characters for subsequent modification; selection values for each of these characters can be defined in any of a variety of ways—for example, in the initial input, or in response to a prompt displayed for any found characters. In still another alternative, the user can define the selection function using interactive graphical input techniques, such as by selecting a mathematical function from collection (e.g., a list) of possible functions and scaling the function across the text object to define the selection as desired, or by drawing or sketching the desired function directly over the relevant text object (e.g., using drawing or painting tools similar to those provided in conventional graphical illustration programs). The value of the function at a given location in the text object defines the selection value for a character at that location.

Thus, the selection can define a range of contiguous characters (e.g., along the length of the text object); it can also define a collection of discrete characters at different locations in the text object, as will be described in more detail below. The selection value can define the amount of modification to be applied at each location as an absolute amount, or as a relative amount—for example, as a proportion of a baseline property value (i.e., an amount corresponding to a 100% modification) by which a property or properties will be modified. Thus, a modification operation can change property values for one or more properties for different characters of the text object in different amounts. For example, the amount of rotation applied to the capital "E" in "Effects" in FIG. 1 can be greater than the amount of rotation applied to the small "e" in "After." The selection function can be defined incrementally, as a sequence of functions that will be combined to define an aggregate selection function for the modification operation. The modification hierarchy defines the order in which each modification operation is applied to the text object.

Figure 2:
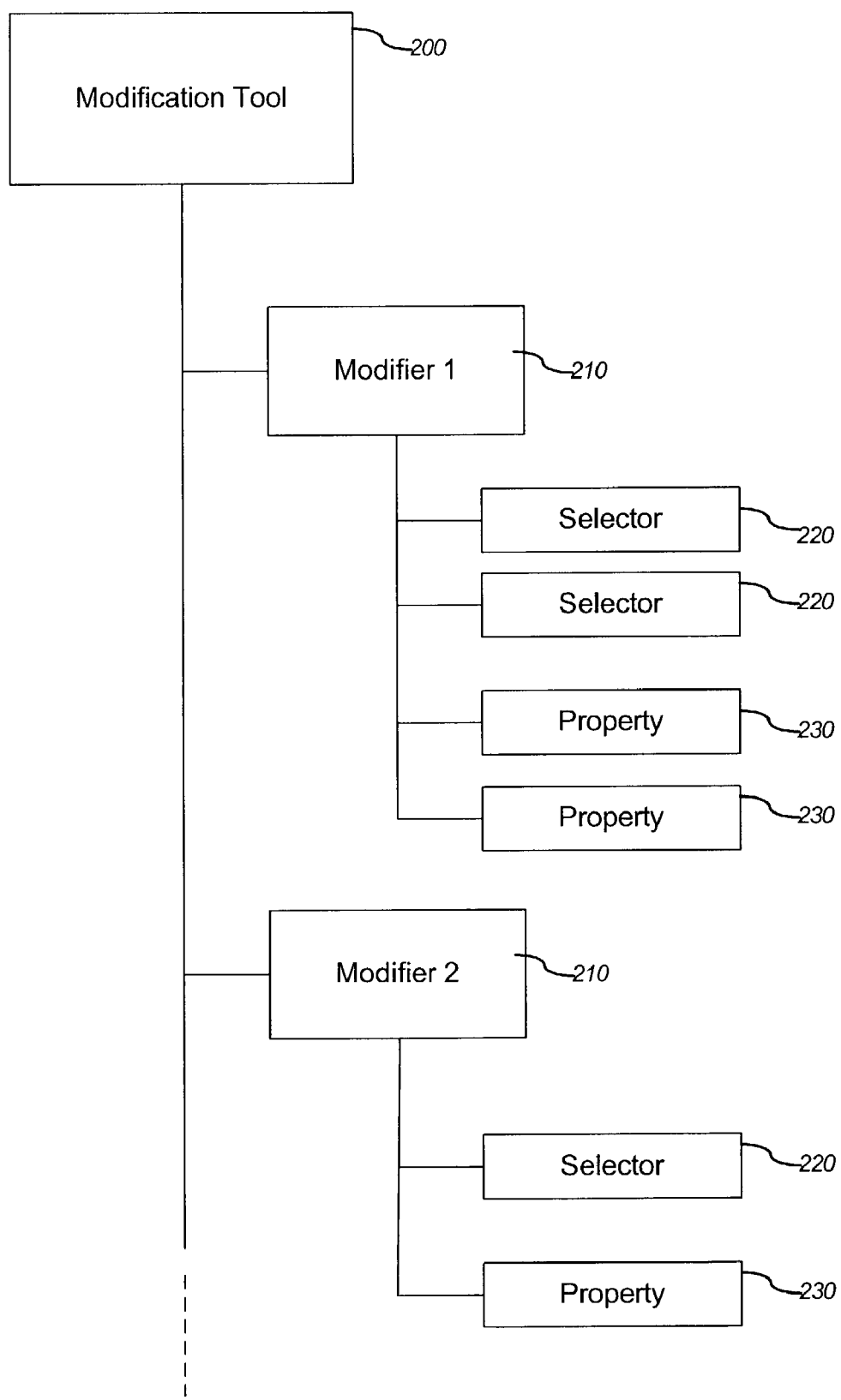
FIG. 2 is a block diagram illustrating an implementation of a text object modification tool.

As shown in FIG. 2, one implementation of a text object modification tool 200 defines a modification hierarchy 240 as a series of Modifiers 210. Each Modifier 210 represents a modification operation that will be applied to modify one or more properties for a specified set of characters of a text object 100. Each Modifier 210 can include one or more selector components 220 ("Selectors") and property components 230 ("Properties"). Each Selector 220 defines a selection of characters in the text object to which the parent Modifier 210 will be applied. Each Selector 220 defines a character selection according to a selection function as described above. The Selector 220 can, for example, specify a range of text units in the text object. For example, a Selector can be defined to select 50% of the words in a text object, such that, in a three word object, the Selector will select all of the first word, half of the second word and none of the third word. The Selector 220 can also specify parts of characters or words. For example, the Selector can be defined to select 50% of each character in the text object, so that half of each character in the text object is modified.

Selectors can have multiple dimensions to represent different selection values per dimension. When computing the modification to be applied to the text, the multiple dimensions can be used for multi-dimensional properties, as discussed below, such that movement of the affected text is not restricted to the diagonal. Further, selection values can be negative. Negative selection values allow movement of the affected text in more than one quadrant. Random selectors can also be specified by the user. For example, a "wiggle" selector can take an input value and randomly generate one or more different output values for its associated properties.

Each Property 230 represents one or more properties that will be modified by a given modification operation. Each Property 230 can represent any property that can used represent the appearance of units of text—such as fill color, fill opacity, anchor point, rotation, size, scale, stroke color, stroke opacity, stroke width, position, skew, or even font or character ID.

Each Property component 230 can specify one or more property operations defining how the properties associated with the Property component will be modified by a given modification operation. A property operation can be a mathematical operation defining how an existing value of a property can be changed based on a selection value. A property operation can be any type of operation that can be performed on a text object. For example, a Property 230 can specify a scale operation that increases (or decreases) the size of affected characters according to the selection value—e.g., multiplying the previous scale value or values by an amount determined by the selection function. For some operations, each Property 230 can define one or more values for each represented property that represent a baseline amount by which the corresponding property will be applied. Thus, for example, a Property 230 representing rotation can specify a baseline value of 90°, such that a 100% application of the parent modifier will result in a rotation of affected characters by 90° (with the rotation applied to characters affected to a lesser degree reduced in an amount corresponding to the relevant selection value). Similarly, for properties defined as two- or higher-dimensional vectors (e.g., scale, color, etc.), the corresponding Property component will define correspondingly more baseline values (e.g., a Property 230 representing scale will specify baseline values representing scale in the x and y dimensions, while a Property 230 representing RGB color can specify three values representing baseline values in the red, green and blue color components, or four values, representing R, G, B and opacity). A Property can also specify negative values. For example, for the property position, x and y can each be negative, allowing the text object to move in all four quadrants. For the wiggle selector described above, selector values can be both positive and negative. When computing the modification to be applied to the text using the wiggle selector, the computed property becomes both positive and negative.

As shown in FIG. 2, each Modifier 210 can include more than one Selector 220 and/or more than one Property 230. If more than one Selector 220 is included in a Modifier 210, an intersection function can define how the Selectors will interact with each other (i.e., how the selection functions specified in each Selector 220 will be combined to define an aggregate selection for the Modifier), as will be described in more detail below.

Figure 3:
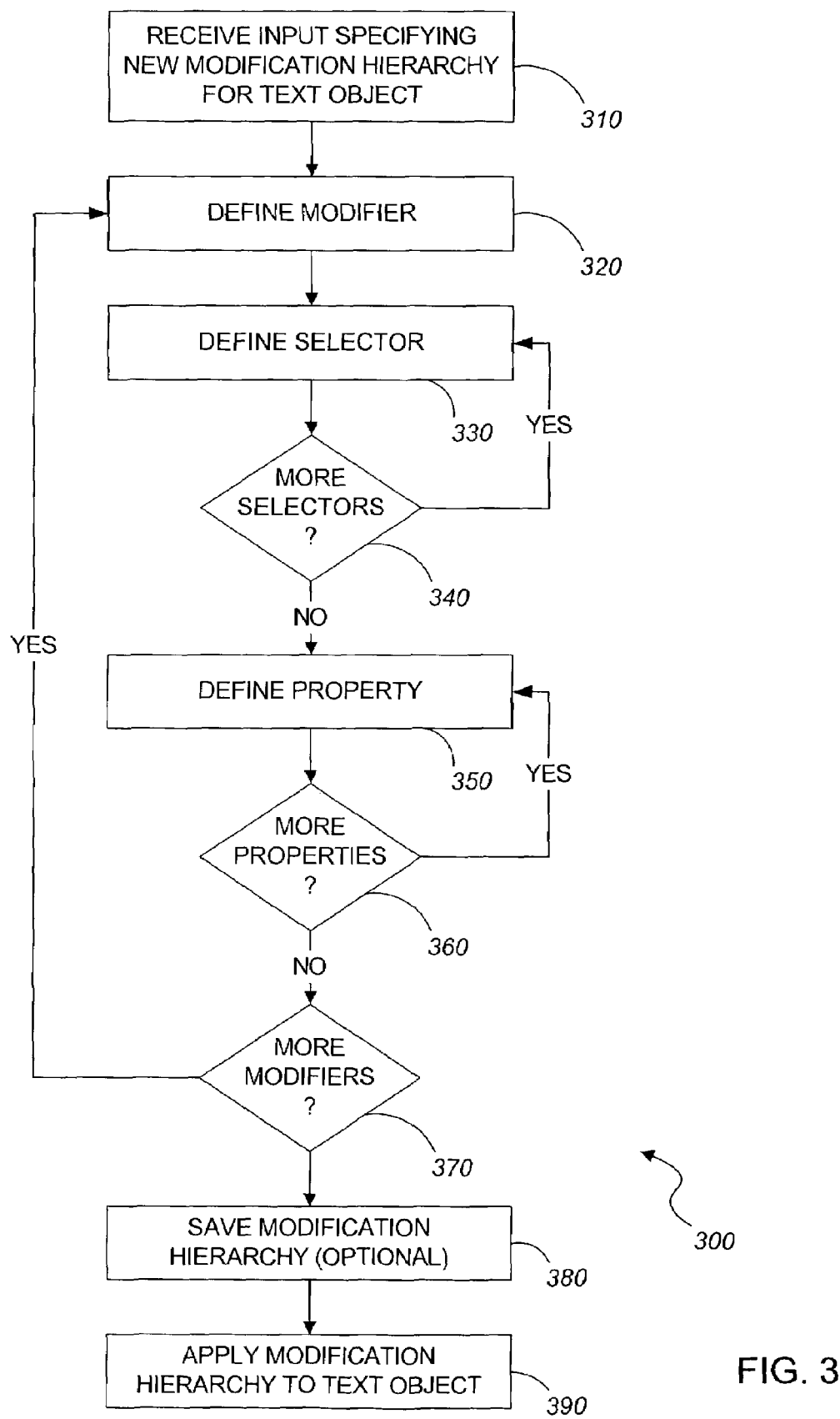
FIG. 3 is a block diagram illustrating an implementation of a system using a modification tool.

FIG. 3 illustrates a method 300 of defining a modification hierarchy that can be used to modify one or more properties of characters in a text object according to one aspect of the invention. Method 300 can be implemented in a graphical illustration program that provides a graphical user interface and a collection of interactive tools that can be used to manipulate text, images and artwork. The method begins when a user specifies that a new modification hierarchy is to be created for a given text object (step 310)—for example, by selecting the desired text object and an appropriate button or menu item in a graphical user interface. In response, the system can present a user with a graphical representation of modification tool 200. The user defines a Modifier 210 (step 320) through interaction with the graphical representation. As illustrated in FIG. 2, the Modifier 210 is a container associated with one or more Selectors 220 and one or more Properties 230.

The user defines one or more Selectors 220 for the Modifier 210 (step 330). For each Selector, the user defines a selection function that will be applied to the text object to identify one or more characters, or portions thereof, that will be affected by the modification or modifications represented by the modification hierarchy. The user can define the selection function using conventional data entry techniques, including graphical techniques—for example, by entering a function as text, by selecting a function from a list, menu or dialog displaying predefined selection functions, or using other techniques, such as drawing or painting a line or other representation of the function using conventional pen or brush tools as are provided in digital image processing applications. The user can select a range of characters through Selectors 220, or can explicitly identify the characters to be modified, as described above. The selection function can include a two-dimensional function defining a character range or ranges and a shape. Subsequent modification of the text object using such a selection function results in the modification of characters within the specified range or ranges by amounts determined by the shape of the selection function.

If desired, the user can define multiple Selectors 220 for the Modifier 210 (the "YES" branch of step 340). If more than one Selector 220 is defined for the Modifier 210, the user can also define an operator that will be used to combine the Selectors (i.e., to combine the selection functions specified for the Selectors) to generate an aggregate selection function for the Modifier 210, as will be described in more detail below.

The user also defines one or more Properties 230 for the Modifier 210 (step 350). As described above, each Property 230 identifies a text property or properties of the text object to be modified, and specifies an operation that will be used to modify the corresponding property or properties when the modification hierarchy is applied to the text object. To define the Property 230, the user identifies the relevant property or properties—for example, by selecting one or more desired properties from a list of properties that are available for the text object. The type of property operation associated with a Property component 230 can depend on particular property or properties associated with the Property component 230. The property operation can be a pre-determined operation that is defined for and associated with the identified properties, such that the property operation is automatically specified based on the user's identification of a property to be associated with the Property 230. Alternatively, the property operation can be defined in response to user input at runtime. For example, a user can select a property operation to associate with a particular property from a list of operations available in the system or for the identified property or properties.

If desired, the user can define multiple Properties 230 for the Modifier 210 (the "YES" branch of step 360). A different Property 230 can be defined for each property to be modified by a given Modifier 210, such that each Property 230 identifies a single property and corresponding property operation. Alternatively, a Property 230 can identify multiple properties. Typically, a Property 230 that identifies multiple properties will define a single property operation that will be used to modify each of the identified properties.

The user can define additional Modifiers 210 for the modification hierarchy (the "YES" branch of step 370). For each new Modifier 210, the user repeats steps 330 to 360 to define one or more Selectors 220 and Properties 230 for the Modifier 210. The arrangement of Modifiers 210, and their associated Selectors 220 and Properties 230 defines a sequence of modifications that will be performed when the modification hierarchy is applied to a text object. Optionally, the user can rearrange the Modifiers 210, or the Selectors 220 and/or Properties 230 at any time to alter the sequence, resulting in a change in the ultimate modifications that will be applied.

Optionally, the modification hierarchy can be saved to memory at any time (step 380). When all desired Modifiers, Selectors and Properties have been defined, the modification hierarchy can be applied to a text object to modify a property or properties of one or more selected characters (step 390), as will be described in more detail below.

Figure 4:
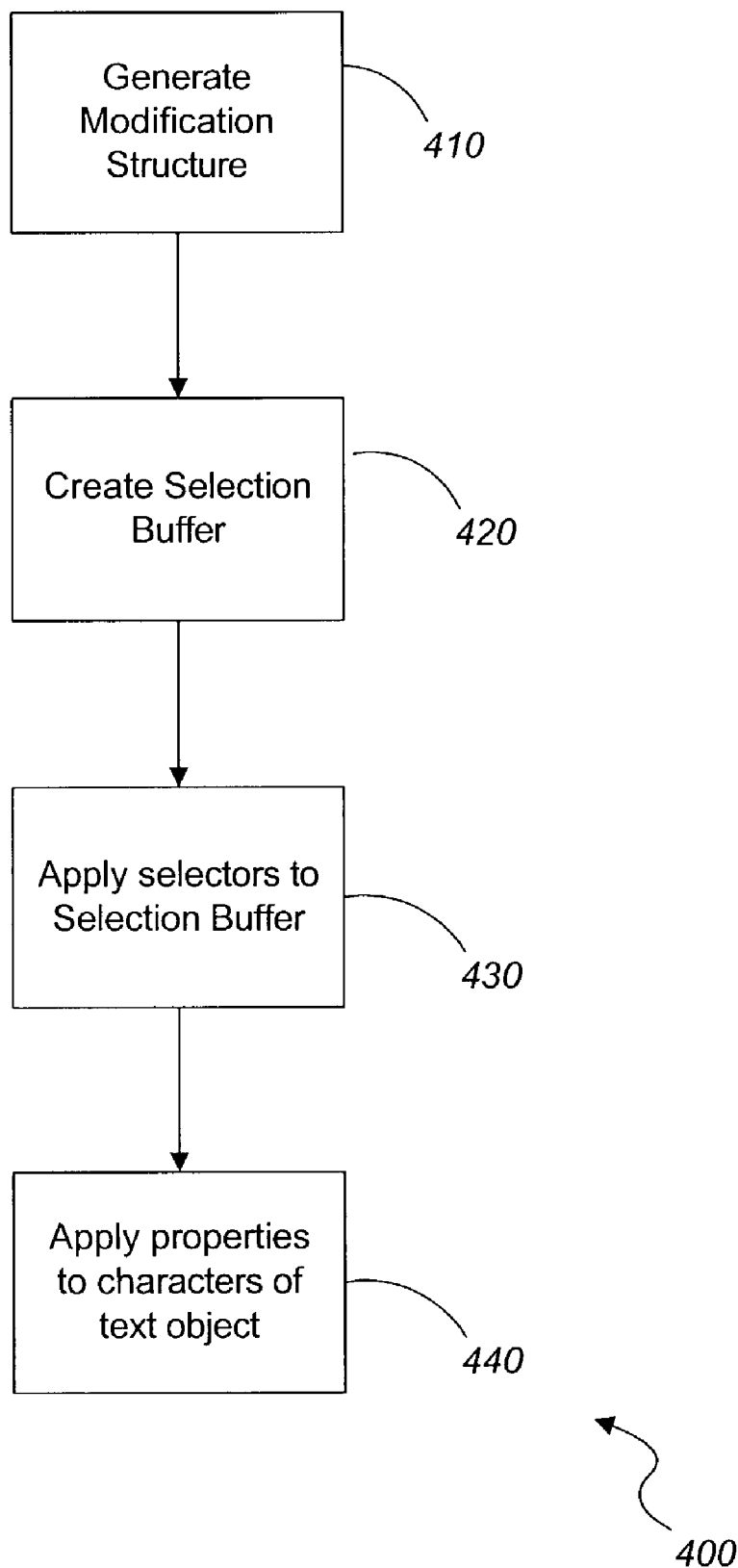
FIG. 4 is a flow diagram illustrating an implementation of a method for modifying a text object.

FIG. 4 is a flow diagram illustrating a method 400 of applying a modification hierarchy to modify one or more characters in a text object according to one aspect of the invention.

Upon receiving instructions to apply a modification hierarchy to a selected text object (for example, upon completion of the generation of a modification hierarchy as described above in reference to FIG. 3), the system generates a modification structure (step 410). The modification structure is a data structure, such as an array, that includes entries corresponding to all characters of a text object to be modified. The structure can also include a list of properties that are currently applied to each character of the text object.

A selection buffer is created for each modifier defined by a user (step 420). Each selection buffer can be sized to correspond to the array. The selection buffer can include one or more values per character of the text object. The values in the selection buffer can be initialized to a predetermined value. For example, the values in the selection buffer can be initialized to zero. The values in the selection buffer can be changed based on selection functions defined by a user.

The system applies Selectors 220 to the values in the selection buffer so that the selection buffer includes aggregate selection values (step 430). The Selectors 220 can be applied by changing values in the selection buffer. Where a plurality of Selectors 220 are defined, mathematical operators can be used to accumulate the selection functions associated with each of the Selectors 220. The mathematical operators can define an order in which Selectors 220 are to be applied. For example, if one Selector is defined to select characters 3-7, another Selector can be defined to subtract characters 5-6. The mathematical operators can also include operations associated with each Selector 220. For example, an operator associated with a first Selector 220 may instruct the system to add selection functions associated with the first Selector 220 while an operator associated with a second Selector 220 may instruct the system to intersect selection functions associated with the second Selector 220.

Mathematical operators can include operators that instruct the system to add, intersect (or multiply), subtract, take the minimum value of ("min") two selection functions (e.g., between the accumulated result from the previous selector(s) and the selection value of the Selector associated with the operator), take the maximum value of ("max") two selection functions, or take an absolute value of the difference ("difference") between two selection functions. Thus, for example, a subtract operator can be implemented as an inverted intersect according to the formula $C (1-A)*B$, where A is the selection value of the Selector associated with the subtract operator, B is the accumulated result from the previous selection function (s), and C is the new accumulated value of the selection functions. Alternatively, a subtract operator can be implemented as a difference between the accumulated value and the selection function associated with the subtract operator, according to the formula $C=A-B$.

The aggregate selection values resulting from applying the Selectors 220 are used to modify the properties specified in Properties 230 for characters of the text object (step 340). The properties are modified according to property operations specified in each Property 230 as discussed above. Thus, for example, if the selection value stored in the selection buffer for a character is 50%, and the Property 230 defines a rotation relative to a baseline of 90°, the character will be modified by applying a rotation in the amount of 45°. For multidimensional properties, a value in the selection buffer can be used for each dimension. For example, for a one-dimensional property, the first value in the selection buffer is used while the first two values in the selection buffer are used for a two dimensional property.

The modification hierarchy (or a combination of different hierarchies) can define a plurality of modifications yielding a plurality of modified text objects, where one or more Modifiers 210 in the hierarchy or hierarchies specify different Selectors 220 or Properties 230 for a specified property for at least one character 110 of a text object 100. For example, each of a plurality of Properties 230 corresponding to a single property or each of a plurality of Selectors 220 corresponding to a character can be defined for different points in time. The system can apply Properties 230 and Selectors 220 to the characters 110 in a text object 100 so that a plurality of modified text objects are defined. For example, for a rotation property, a first selection value for character 1 can be 50%, while a second selection value for character 1 can be 75%. Thus, if the Property 230 defines a rotation of 90°, a first modified text object can have character 1 rotated 45°, while a second modified text object can have character 1 rotated 67.5°. An animation sequence can be defined based on the text object and the plurality of modified text objects. Thus, a plurality of modified text objects can be defined and used together to define the animation sequence.

Figure 5A:
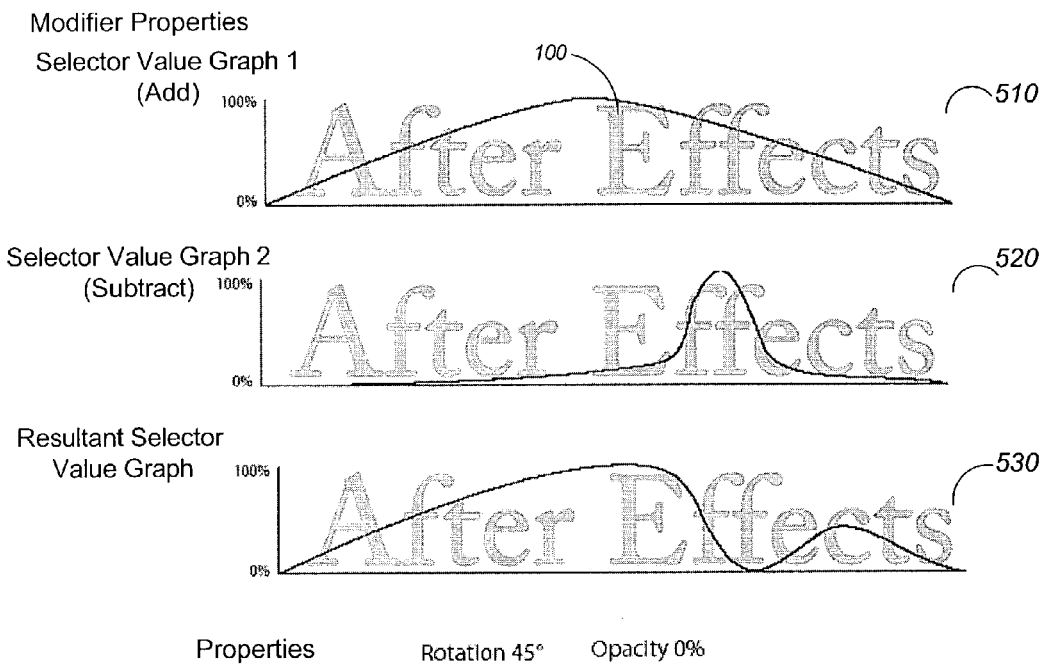
FIG. 5A and FIG. 5B are illustrations of the application of a modification tool to a text object.
Figure 5B:

FIG. 5A and FIG. 5B illustrate an application of modification tool 200 with reference to a text object 500. FIG. 5A illustrates the definition and application of Modifiers 210 for a text object 100. The Modifiers include a plurality of Selectors 220 and a plurality of Properties to be applied. In the example of FIG. 5A, the Selectors include functions 510, 520 that are defined by a user. For example, a user can graphically manipulate each function 510, 520 at points corresponding to each letter of text object 100. As shown, the function 510 specifies an "ADD" selection function, defining a selection that gradually increases from the left edge of the text object to peak at the point corresponding to the capital "E" in "Effects," and then decreases over the remainder of the text object. The "ADD" operator indicates that the resulting selection values will equate to a "positive" change in affected properties, such that the resulting modification will be largest for the characters centered around the "E". Function 520, specifies a "SUBTRACT" selection function with a maximum centered around the two letters "f" in "Effects." The "SUBTRACT" operator indicates that this function is to be subtracted from the others specified for the Modifier 210.

Functions 510 and 520 are combined to give a resultant selection function 530 that reflects aggregate selection values for each character of the text object 100 by performing the mathematical operators specified for each selection function 510, 520. Thus, the resultant selector graph 530 reflects the addition of the first Selector (selection function 510) and the subtraction of the second Selector (selection function 520). According to the aggregate selection function 530, the ultimate selection for the Modifier increases gradually from left to right to peak at the capital "E" in "Effects," and then decrease through the next character to go to zero at the second "f" in "Effects", thereafter reaching a smaller peak at the subsequent "c" before decreasing again to zero at the right edge of the text object.

The Modifier 210 includes a single Property 230 that identifies the properties of rotation and opacity and specifies a modification relative to a different baseline value for each property (45 degrees for rotation and 0% for opacity). FIG. 5B illustrates the modified text object 540 that results from the application of the Modifier illustrated in FIG. 5A to the text object 100. As illustrated in FIG. 5B, the amount of rotation and opacity applied to the characters of the original text object gradually increase from an initial minimum at the starting "A" at the left edge of the text object, and reach a maximum amount of rotation and opacity at the capital "E" in "Effects" corresponding to the peak in the aggregate selection function 530. Thereafter, the amount of rotation and opacity relative to the baseline values decrease over the following character before increasing slightly to another, smaller, peak at the "c" in "Effects" before gradually decreasing again to zero at the final "s" at the object's right edge.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The invention has been described in terms of particular embodiments. Other embodiments are within the scope of the following claims. For example, the steps of the invention can be performed in a different order and still achieve desirable results.

What is claimed is:

1. A computer-implemented method, comprising:
defining a modifier to be applied to a text object having text units, wherein defining the modifier comprises:
defining two or more selection functions for the modifier, each selection function identifying two or more of the text units and setting selection values that can vary among the two or more text units, the selection values being non-binary and representing a degree of modification to be applied;
associating the two or more selection functions with the modifier;
defining one or more property components for the modifier, each property component specifying a modification of a property associated with the two or more the text units;
associating the one or more property components with the modifier; and
in response to an instruction to apply the modifier to the text object, combining the two or more selection functions to calculate aggregate selection values and modifying the text object by applying the modification specified by each of the one or more property components associated with the modifier to the two or more text units on a per text unit basis and in accordance with the aggregate selection values; and
using the modifier to create a plurality of modified text objects; and
defining an animation sequence based on the text object and the plurality of modified text objects.

2. The method of claim 1, wherein:
the text units represent one of characters in the text object or words in the text object.

3. The method of claim 1, wherein the modifier is a first modifier, the method further comprising:
defining a second modifier; and
in response to an instruction to apply the first and second modifiers to the text object, modifying the text object in accordance with the first and second modifiers.

4. The method of claim 1, wherein:
two selection functions are defined for and associated with the modifier; and
only one property operation is defined for and associated with the modifier.

5. The method of claim 1, wherein:
the two or more selection functions are combined using one or more operators from the group containing an addition operator, a subtraction operator, an intersect operator, a min operator, a max operator, and a difference operator.

6. The method of claim 1, further comprising:
rendering the modified text object.

7. The method of claim 1, further comprising:
receiving user input through a graphical user interface to manipulate the selection values.

8. The method of claim 1, wherein the one or more properties includes one from the group containing: fill color, fill opacity, anchor point, rotation, size, scale, stroke color, stroke opacity, stroke width, position, skew, font and character ID.

9. The method of claim 1, wherein defining the modifier further comprises receiving user input to graphically draw the selection values over the two or more text units.

10. The method of claim 1, wherein defining the modifier further comprises receiving user input to select a mathematical function indicating the selection values over the two or more text units.

11. A computer program product, stored on a tangible information carrier, the product comprising instructions operable to cause a computer system to perform a method comprising:
defining a modifier to be applied to a text object having text units, wherein defining the modifier comprises:
defining two or more selection functions for the modifier, each selection function identifying two or more of the text units and setting selection values that can vary among the two or more text units, the selection values being non-binary and representing a degree of modification to be applied;
associating the two or more selection functions with the modifier;
defining one or more property components for the modifier, each property component specifying a modification of a property associated with the two or more text units;
associating the one or more property components with the modifier;
in response to an instruction to apply the modifier to the text object, combining the two or more selection functions to calculate aggregate selection values and modifying the text object by applying the modification specified by each of the one or more property components associated with the modifier to the two or more text units on a per text unit basis and in accordance with the aggregate selection values;

using the modifier to create a plurality of modified text objects; and defining an animation sequence based on the text object and the plurality of modified text objects.

12. The computer program product of claim 11, wherein:
the text represent one of characters in the text object or words in the text object.

13. The computer program product of claim 11, wherein the modifier is a first modifier, the method further comprising:
defining a second modifier; and
in response to an instruction to apply the first and second modifiers to the text object, modifying the text object in accordance with the first and second modifiers.

14. The computer program product of claim 11, wherein:
two selection functions are defined for and associated with the modifier; and
only one property operation is defined for and associated with the modifier.

15. The computer program product of claim 11, wherein:
the two or more selection functions are combined using one or more operators from the group containing an addition operator, a subtraction operator, an intersect operator, a min operator, a max operator, and a difference operator.

16. The computer program product of claim 11, further comprising:
rendering the modified text object.

17. The computer program product of claim 11, further comprising:
receiving user input through a graphical user interface to manipulate the selection values.

18. The computer program product of claim 11, wherein the one or more properties includes one from the group containing: fill color, fill opacity, anchor point, rotation, size, scale, stroke color, stroke opacity, stroke width, position, skew, font and character ID.

19. The computer program product of claim 11, wherein defining the modifier further comprises receiving user input to graphically draw the selection values over the two or more text units.

20. The computer program product of claim 11, wherein defining the modifier further comprises receiving user input to select a mathematical function indicating the selection values over the two or more text units.

21. A computer-implemented method, comprising:
defining text animation with a plurality of modifiers to be applied to a text object having text units and a sequence of modifiers;
defining one or more selection functions for each of the plurality of modifiers, each selection function identifying one or more of the text units and setting a non-binary selection value representing a relative amount of modification to be applied;
defining one or more property operations for each selection function, each property operation specifying a modification of one or more properties associated with the one or more of the text units and having a baseline value representing a complete application of the modification; and
animating the text object including applying the plurality of modifiers to the one or more selection functions on a per selection function basis in accordance with the selection value relative to the baseline value and the sequence of modifiers.

22. The method of claim 21, wherein defining the sequence of modifiers further comprises setting points in time.

23. The method of claim 21, wherein animating the text object comprises defining an animation sequence for each property operation with respect to two or more of the one or more selection functions with mathematical operators that indicate an order for application of the relative amount to the one or more selection functions.

24. The method of claim 21, wherein the selection value comprises two or more dimensions.

25. The method of claim 21, further comprising:
rendering the modified text object for output in an order of the sequence of modifiers.

26. A system comprising:
a machine-readable storage device including a computer program product;
a display device; and
one or more processors capable of interacting with the display device and the machine-readable storage device, and operable to execute the computer program product to perform operations comprising:
defining a modifier to be applied to a text object having text units, wherein defining the modifier comprises:
defining two or more selection functions for the modifier, each selection function identifying two or more of the text units and setting selection values that can vary among the two or more text units, the selection values being non binary and representing a degree of modification to be applied;
associating the two or more selection functions with the modifier;
defining one or more property components for the modifier, each property component specifying a modification of a property associated with the two or more text units;
associating the one or more property components with the modifier; and
in response to an instruction to apply the modifier to the text object, combining the two or more selection functions to calculate aggregate selection values and modifying the text object by applying the modification specified by each of the one or more property components associated with the modifier to the two or more text units on a per text unit basis and in accordance with the aggregate selection values; and
using the modifier to create a plurality of modified text objects; and
defining an animation sequence based on the text object and the plurality of modified text objects.

27. The system of claim 26, wherein:
the text units represent one of characters in the text object or words in the text object.

28. he system of claim 26, wherein the modifier is a first modifier, the method further comprising:
defining a second modifier; and
in response to an instruction to apply the first and second modifiers to the text object, modifying the text object in accordance with the first and second modifiers.

29. The system of claim 26, wherein:
two selection functions are defined for and associated with the modifier; and
only one property operation is defined for and associated with the modifier.

30. The system of claim 26, wherein:
the two or more selection functions are combined using one or more operators from the group containing an addition operator, a subtraction operator, an intersect operator, a min operator, a max operator, and a difference operator.

31. The system of claim 26, further comprising:
rendering the modified text object.

32. The system of claim 26, further comprising:
receiving user input through a graphical user interface to manipulate the selection values.

33. The system of claim 26, wherein the one or more properties includes one from the group containing: fill color, fill opacity, anchor point, rotation, size, scale, stroke color, stroke opacity, stroke width, position, skew, font and character ID.

34. The system of claim 26, wherein defining the modifier further comprises receiving user input to graphically draw the selection values over the two or more text units.

35. The system of claim 26, wherein defining the modifier further comprises receiving user input to select a mathematical function indicating the selection values over the two or more text units.

36. A system comprising:
a machine-readable storage device including a computer program product;
a display device; and
one or more processors capable of interacting with the display device and the machine-readable storage device, and operable to execute the computer program product to perform operations comprising:
defining text animation with a plurality of modifiers to be applied to a text object having text units and a sequence of modifiers;
defining one or more selection functions for each of the plurality of modifiers, each selection function identifying one or more of the text units and setting a non-binary selection value representing a relative amount of modification to be applied;
defining one or more property operations for each selection function, each property operation specifying a modification of one or more properties associated with the one or more text units and having a baseline value representing a complete application of the modification; and
animating the text object including applying the plurality of modifiers to the one or more selection functions on a per selection function basis in accordance with the selection value relative to the baseline value and the sequence of modifiers.

37. The system of claim 36, wherein defining the sequence of modifiers further comprises setting points in time.

38. The system of claim 36, wherein the text object comprises defining an animation sequence for each property operation with respect to two or more of the one one or more selection functions with mathematical operators that indicate an order for application of the relative amount to the one or more selection functions.

39. The system of claim 36, wherein the selection value comprises two or more dimensions.

40. The system of claim 36, further comprising:
rendering the modified text object for output in an order of the sequence of modifiers.

41. A computer program product, stored on a tangible information carrier, the product comprising instructions operable to cause a computer system to perform a method comprising:
defining text animation with a plurality of modifiers to be applied to a text object having text units and a sequence of modifiers;
defining one or more selection functions for each of the plurality of modifiers, each selection function identifying one or more of the text units and setting a non-binary selection value representing a relative amount of modification to be applied;
defining one or more property operations for each selection function, each property operation specifying a modification of one or more properties associated with the one or more text units and having a baseline value representing a complete application of the modification; and
animating the text object including applying the plurality of modifiers to the one or more selection functions on a per selection function basis in accordance with the selection value relative to the baseline value and the sequence of modifiers.

42. The computer program product of claim 41, wherein defining the sequence of modifiers further comprises setting points in time.

43. The computer program product of claim 41, wherein animating the text object comprises defining an animation sequence for each property operation with respect to two or more of the one or more selection functions with mathematical operators that indicate an order for application of the relative amount to the one or more selection functions.

44. The computer program product of claim 41, wherein the selection value comprises two or more dimensions.

45. The computer program product of claim 41, further comprising:
rendering the modified text object for output in an order of the sequence of modifiers.

* * * * *

UNITED STATES PATENT AND TRADEMARK OFFICE
CERTIFICATE OF CORRECTION

PATENT NO. : 7,453,464 B1
APPLICATION NO. : 10/382663
DATED : November 18, 2008
INVENTOR(S) : James Acquavella It is certified that error appears in the above-identified patent and that said Letters Patent is hereby corrected as shown below:

On the Title Page; item (56) - OTHER PUBLICATIONS:
   left column, line 41:
      delete "Copy right", and replace with --Copyright-- right column, line 2:
      delete "□□"

right column, line 12:
      delete "Shits", and replace with --Ships--

Claim 12:
   column 11, line 9:
      insert --units--, after the first occurrence of "text"

Claim 28:
   column 12, line 52:
      delete "he", and replace with --The--

Claim 38:
   column 13, line 46:
      insert --animating--, after "wherein"

column 14, line 1:
      delete "one one", and insert --one--

Signed and Sealed this

Twenty-fourth Day of March, 2009

JOHN DOLL
*Acting Director of the United States Patent and Trademark Office*